United States Patent [19]

Daniek et al.

[11] 4,309,178
[45] Jan. 5, 1982

[54] PROCESS FOR ISOLATING SULPHUR DYESTUFFS FROM AQUEOUS CRUDE MELTS CONTAINING SODIUM POLYSULPHIDE

[75] Inventors: Georg Daniek, Frankfurt am Main; Artur Meyer, Schöneck; Wolf Weidemüller, Frankfurt am Main, all of Fed. Rep. of Germany

[73] Assignee: Cassella Aktiengesellschaft, Frankfurt, Fed. Rep. of Germany

[21] Appl. No.: 197,814

[22] Filed: Oct. 17, 1980

[30] Foreign Application Priority Data

Oct. 22, 1979 [DE] Fed. Rep. of Germany ....... 2942591

[51] Int. Cl.³ ............................................. C09B 49/00
[52] U.S. Cl. .......................................... 8/551; 8/555; 8/558; 8/652
[58] Field of Search ..................... 8/652, 555, 558, 551

[56] References Cited

U.S. PATENT DOCUMENTS

| | | | |
|---|---|---|---|
| 2,373,261 | 4/1945 | Robinson et al. | 8/652 |
| 2,801,995 | 8/1957 | Strouse | 260/134 |
| 3,600,121 | 8/1971 | Feldmann | 8/652 |

FOREIGN PATENT DOCUMENTS

| | | |
|---|---|---|
| 817155 | 1/1975 | Belgium . |
| 887254 | 1/1962 | United Kingdom . |
| 1274048 | 5/1972 | United Kingdom . |

*Primary Examiner*—A. Lionel Clingman
*Attorney, Agent, or Firm*—Connolly and Hutz

[57] ABSTRACT

In the processs for isolating solid sulphur dyestuffs from crude sulphur dyestuff melts, the improvement comprises adding $10^{-4}$ to 1% by weight, relative to the amount of dyestuff, of an organic flocculating auxiliary to the crude dyestuff melt to produce a filterable dyestuff precipitate and then separating said precipitate.

7 Claims, No Drawings

PROCESS FOR ISOLATING SULPHUR DYESTUFFS FROM AQUEOUS CRUDE MELTS CONTAINING SODIUM POLYSULPHIDE

The invention relates to a process for isolating sulphur dyestuffs from crude sulphur dyestuff melts which contain sodium polysulphide and are obtained in the manufacture of these dyestuffs by known sulphurisation processes, such as the reflux and bake processes and to the sulphur dyestuffs isolated by the process according to the invention.

Sulphur dyestuffs are in most cases manufactured by direct sulphurisation of suitable known organic compounds. The sulphurisation is carried out in a known manner by reaction with elementary sulphur and a relatively small amount of alkali, or by reaction with alkali metal polysulphide. The reactions can be carried out in the presence of water and/or an organic solvent by the so-called "reflux process" or without any solvent, by the so-called "bake process".

In most cases, the sulphurisation is followed by isolation of the resulting sulphur dyestuffs in order to free the products from most of the concomitant products and by-products which result during sulphurisation, and from excess sulphur, alkali metal polysulphide and the like. For this isolation, the crude products from the baked melts are, as a rule, first taken up in water or decomposed with sodium hydroxide solution, whilst any organic solvent present in the crude boiled melts is in most cases largely distilled off and replaced by water. Aqueous systems of the crude dyestuffs are thus initially obtained, from which the dyestuffs must be isolated. This is usually effected by atmospheric oxidation, precipitation with acid or precipitation with sodium chloride, the sulphur dyestuffs being converted into a filterable form, and subsequent filtration.

A large number of sulphur dyestuffs can be isolated by several of the processes mentioned and the choice of process is then determined less by the nature and the behaviour of the dyestuff than by practical operating circumstances.

The conventional processes for isolating the sulphur dyestuffs all have certain economic, ecological and quality disadvantages. Atmospheric oxidation of the crude dyestuff melt containing sodium polysulphide requires long reaction times, partial modification of the dyestuff frequently taking place. In addition, it is necessary to purify the waste air in order to exclude the emission of harmful substances. Purification of the waste air also proves to be necessary in the process of precipitation with acid. The large amount of material employed, for example mineral acids, such as hydrochloric acid or sulphuric acid, is also a factor. In the process of salting out sulphur dyestuffs from the aqueous crude melts containing alkali metal polysulphide, several times the weight of sodium chloride, relative to the pure dyestuff, is usually employed, which again necessitates the use of large amounts of material. A further disadvantage of this process is the heavy salt pollution of the filtrate from the dyestuff. In addition, it is frequently necessary to suspend and filter the product again in order to reduce the salt content in the isolated dyestuff.

It has now been found that sulphur dyestuffs which have hitherto been isolated from the crude melts with the addition of large amounts of salt can be converted into a filterable form in a surprisingly elegant manner by adding $10^{-4}$ to 1 percent by weight, preferably $10^{-2}$ to 1 percent by weight, relative to the amount of dyestuff, of an organic flocculating auxiliary to the crude melts.

Organic flocculating auxiliaries which can be used according to the invention are those based on polyacrylic acid, polymethacrylic acid, alkali metal polyacrylates and polymethacrylates, especially sodium polyacrylates and polymethacrylates, polyacrylamide, polymethacrylamide, N-methylamino alkyl acrylate having 2 to 4 alkyl carbon atoms, N-methylamino alkyl methacrylate having 2 to 4 alkyl carbon atoms, N-dimethyl alkyl methacrylate having 2 to 4 alkyl carbon atoms, quaternized amino alkyl acrylate 2 to 4 alkyl carbon atoms, quaternized amino alkyl acrylate having 2 to 4 alkyl carbon atoms, quaternized amino alkyl methacrylate having 2 to 4 alkyl carbon atoms, quaternized N-methylamino alkyl acrylate having 2 to 4 alkyl carbon atoms, quaternized N-dimethylamino alkyl acrylate having 2 to 4 alkyl carbon atoms, quaternized N-methylamino alkyl methacrylate having 2 to 4 alkyl carbon atoms, quaternized N-dimethyl alkyl methacrylate having 2 to 4 alkyl carbon atoms, polyethylene oxide or polyethyleneimine, and on derivatives of these polymers, such as, for example, saponification and partial saponification products. Copolymers of the monomers on which the polymers mentioned are based can also be used as flocculating auxiliaries. The beforementioned quaternized products are especially those which are obtained by reacting the corresponding nitrogen-containing compound with an appropriate acid, especially acetic acid.

Polymers and copolymers of acrylic acid, methacrylic acid, alkali metal acrylate and methacrylate, especially sodium acrylate and methacrylate, acrylamide acrylic acid dimethylaminoethyl ester or methacrylic acid dimethylaminoethyl ester and partial saponification products or quaternisation products thereof are preferably used according to the invention.

Examples of commercially available products that can be used in the process of the present invention as organic flocculating auxiliaries (the manufacturers of the products are given in parentheses) are as follows: Hercofloc (Hercules), Hydropur (Cassella AG), Magnafloc, Superfloc and Zetaps (Allied Colloids Manufacturing), Nalco (Nalco), Praestol (Chemische Fabrilk Stockhausen), Sedipur (BASF), Separan (Dow Chemical).

It proves to be appropriate to add the flocculating agent in the form of a 0.01–1.0 percent straight by weight aqueous solution. After precipitation, the dyestuff is isolated in a manner which is in itself known, for example by filtration.

The isolation of sulphur dyestuffs, with the inclusion of the precipitation operation according to the invention, thus consists of the following steps:

preparation of the aqueous crude melt, containing sodium polysulphide, of the sulphur dyestuff with a temperature of 20° to 100° C., preferably 30°–70° C., addition of $10^{-4}$ to 1 percent by weight of one of the flocculating auxiliaries mentioned to this crude melt, whilst stirring, the flocculating auxiliary being added in the form of a 0.01 to 1.0 percent strength by weight aqueous solution, subsequent stirring of the crude melt containing the flocculating auxiliary for a period of 0.5 to 5 hours, filtration of the resulting suspension on a suitable filtering unit, such as a filter press, suction filter, rotary filter or the like, and rinsing of the filter cake to remove the mother liquor from the cake.

By means of this process, it is thus possible to isolate sulphur dyestuffs, which have hitherto been converted into a filterable form by the addition of large amounts of salt, from aqueous crude melts containing sodium polysulphide, the new process having the following advantages compared with the conventional process:

very small amount of material employed,
short reaction time,
only one filtration necessary,
no loss in quality due to the isolation process,
no pollution of the waste air, and
no additional pollution of the effluent caused by the isolation process.

It could not be predicted and was extremely surprising that, by adding relatively very small amounts of water-soluble organic polymers, it is possible to precipitate large amounts of sulphur dyestuffs, for which amounts of salt of the order of size of the amount of dyestuffs obtained, and above, where hitherto necessary.

The sulphur dyestuffs isolated according to the invention contain substantially smaller amounts of impurities than those isolated by the process used hitherto, and they are virtually free from salts. They are thus particularly suitable for the preparation of highly concentrated dyestuff formulations.

The following embodiment examples illustrate the process according to the invention.

EXAMPLE 1

15 g of a 0.05% strength by weight aqueous solution of a commercially available copolymer of acrylamide and β-dimethylaminoethyl methacrylate are added, at 50° C. and whilst stirring, to 2,200 g of a 9% strength by weight aqueous crude sulphur dyestuff melt which contains sodium polysulphide and is present after 3-(4-hydroxyanilino)-carbazole has been reacted with sodium polysulphide of the formula $Na_2S_{5.6}$ in boiling n-butanol and after the n-butanol has subsequently been driven off with steam, the mixture is stirred at 50° C. for 2 hours and filtered and the material on the filter is washed with distilled water. After drying, 198 g of the blue sulphur dyestuff with the Color Index No. 53630 are obtained.

EXAMPLE 2

0.02 g of a commercially available polyacrylic acid derivative with 90% of carboxamide groups and 10% of carboxyl groups, in the form of a 1% strength by weight solution, are added, at 30° C. and whilst stirring, to 1,200 g of a 10% strength by weight aqueous crude sulphur dyestuff melt which contains sodium polysulphide and is present after 3-(4-hydroxyanilino)-9-ethyl-carbazole has been reacted with sodium polysulphide of the formula $Na_2S_6$ in boiling n-butanol and after the n-butanol has subsequently been driven off with steam, the mixture is stirred at 30° C. for 1 hour and filtered and the material on the filter is washed with distilled water. After drying, 120 g of the blue sulphur dyestuff with the color index No. 53640 are obtained.

The sulphur dyestuff which is formed in the reaction of 2-(4-hydroxyanilino)-naphthalene with sodium polysulphide of the formula $Na_2S_{7.2}$ in n-butanol can likewise be isolated as described in Examples 1 and 2. The black sulphur dyestuff with the Color Index No. 53290 is obtained.

EXAMPLE 3

45 g of a 1% strength by weight aqueous solution of an approximately 30% strength aqueous solution of a commercially available partially saponified polyacrylamide with a degree of saponification of 20% are added, at 60° C. and whilst stirring, to 1,800 g of an 18% strength by weight crude aqueous sulphur dyestuff melt which contains sodium polysulphide and is present after 3-(4-hydroxyanilino)-carbazole has been reacted with sodium polysulphide of the formula $Na_2S_{5.9}$ in a solvent, such as ethylene glycol monoethyl ether or diethylene glycol monoethyl ether, and the reaction mixture has subsequently been diluted with water, the mixture obtained is stirred at 60° C. for 1 hour and filtered and the material on the filter is washed with distilled water. After drying, 324 g of the blue sulphur dyestuff with the Color Index No. 53630 are obtained.

Sulphur dyestuffs which are formed by reacting mixtures of the starting compounds described above with sodium polysulphide can likewise be isolated as described in Examples 1 to 3.

Other examples of sulphur dyestuffs which have hitherto been converted into a filterable form by adding salt and which can particularly advantageously be isolated analogously to Examples 1 to 3 by the process according to the invention, are the dyestuff with the C.I. Number 53235, manufactured by sulphurisation of p-(2,4-dinitroanilino) phenol, and the dyestuff with the C. I. Number 53720, obtained by sulphurising 8-amino-7-methyl-2-phenazinol.

What is claimed is:

1. In the process for isolating solid sulphur dyestuffs from crude sulphur dyestuff melts, the improvement comprises adding $10^{-4}$ to 1% by weight, relative to the amount of dyestuff, of an organic flocculating auxiliary to the crude dyestuff melt to produce a filterable dyestuff precipitate and then separating said precipitate wherein the organic flocculating auxiliary is a polymer or copolymer containing monomeric units selected from the group consisting of acrylic acid, methacrylic acid, alkali acrylate, alkali methacrylate, acrylamide, methacrylamide, amino alkyl acrylate having 2 to 4 alkyl carbon atoms, amino alkyl methacrylate having 2 to 4 alkyl carbon atoms, N-methylamino alkyl acrylate having 2 to 4 alkyl carbon atoms, N-dimethylamino alkyl acrylate having 2 to 4 alkyl carbon atoms, N-methylamino alkyl methacrylate having 2 to 4 alkyl carbon atoms, quaternized amino alkyl acrylate having 2 to 4 alkyl carbon atoms, quaternized amino alkyl methacrylate having 2 to 4 alkyl carbon atoms, quaternized N-methylamino alkyl acrylate having 2 to 4 alkyl carbon atoms, quaternized N-dimethylamino alkyl acrylate having 2 to 4 alkyl carbon atoms, quaternized N-methylamino alkyl methacrylate having 2 to 4 alkyl carbon atoms, quaternized N-dimethyl alkyl methacrylate having 2 to 4 alkyl carbon atoms, ethylene oxide, ethylene imine and their saponification products.

2. The process according to claim 1 wherein the organic flocculating auxiliary is a polymer or copolymer containing monomeric units of acrylic acid, methacrylic acid, sodium acrylate, sodium methacrylate, acrylamide, acrylic acid dimethylaminoethyl ester as well as its partial saponification or quaternization product, or methacrylic acid dimethylaminoethyl ester as well as its partial saponification or quaternization product.

3. The process according to claim 1 wherein the organic flocculating auxiliary is alkali metal polyacrylate or alkali metal polymethacrylate.

4. The process according to claim 1 wherein the organic flocculating auxiliary is a copolymer of acrylamide and β-dimethylaminoethyl methacrylate.

5. The process according to claim 1 wherein the organic flocculating auxiliary is partially saponified polyacrylamide.

6. The process according to claim 1 wherein the amount of flocculating auxiliary is $10^{-2}$ to 1% by weight, relative to the amount of dyestuff.

7. Sulphur dyestuffs isolated by the process of claim 1.

* * * * *